United States Patent [19]
Hendrickson et al.

[11] Patent Number: 4,569,201
[45] Date of Patent: Feb. 11, 1986

[54] BRAKE ACTUATION ASSEMBLY AND METHOD OF ASSEMBLY

[75] Inventors: Richard T. Hendrickson; Lawrence R. Myers, both of South Bend, Ind.

[73] Assignee: Allied Corporation, Morristown, N.J.

[21] Appl. No.: 547,320

[22] Filed: Oct. 31, 1983

[51] Int. Cl.⁴ ............................................. B60T 13/00
[52] U.S. Cl. ..................................... 60/547.1; 60/554; 60/562
[58] Field of Search ....................... 60/547.1, 553, 554, 60/562; 91/369 R, 369 B

[56] References Cited

U.S. PATENT DOCUMENTS

| 2,603,066 | 7/1952 | Rockwell | 60/557 |
| 2,900,962 | 8/1959 | Ingres | 60/547.1 |
| 2,929,216 | 3/1960 | Stelzer | 60/553 |
| 2,957,454 | 10/1960 | Stelzer | 60/551 |
| 3,172,337 | 3/1965 | Randol | 60/554 |
| 3,408,815 | 11/1968 | Stelzer | 60/551 |
| 3,564,849 | 2/1971 | Huruta | 60/562 |
| 4,400,943 | 8/1983 | Belart | 60/547.1 |
| 4,423,597 | 1/1984 | Spielmann | 60/547.1 |

FOREIGN PATENT DOCUMENTS

| 45231 | 2/1982 | European Pat. Off. | 60/547.1 |
| 45233 | 2/1982 | European Pat. Off. | 60/547.1 |
| 2073345 | 10/1981 | United Kingdom . | |

Primary Examiner—Abraham Hershkovitz
Attorney, Agent, or Firm—Leo H. McCormick, Jr.; Ken C. Decker

[57] ABSTRACT

A brake actuation assembly (10) and its method of assembly wherein a connecting pin (173) between a movable wall (101) and a torque tube (66) is retained by a keyway (141) in a plunger (140). The pin (173) moves in a slot (69) in the tube (66) in response to a reaction force to provide an input push rod (196) with an indication of the pressurized fluid supplied to a wheel brake (22, 24, 26, and 28).

9 Claims, 1 Drawing Figure

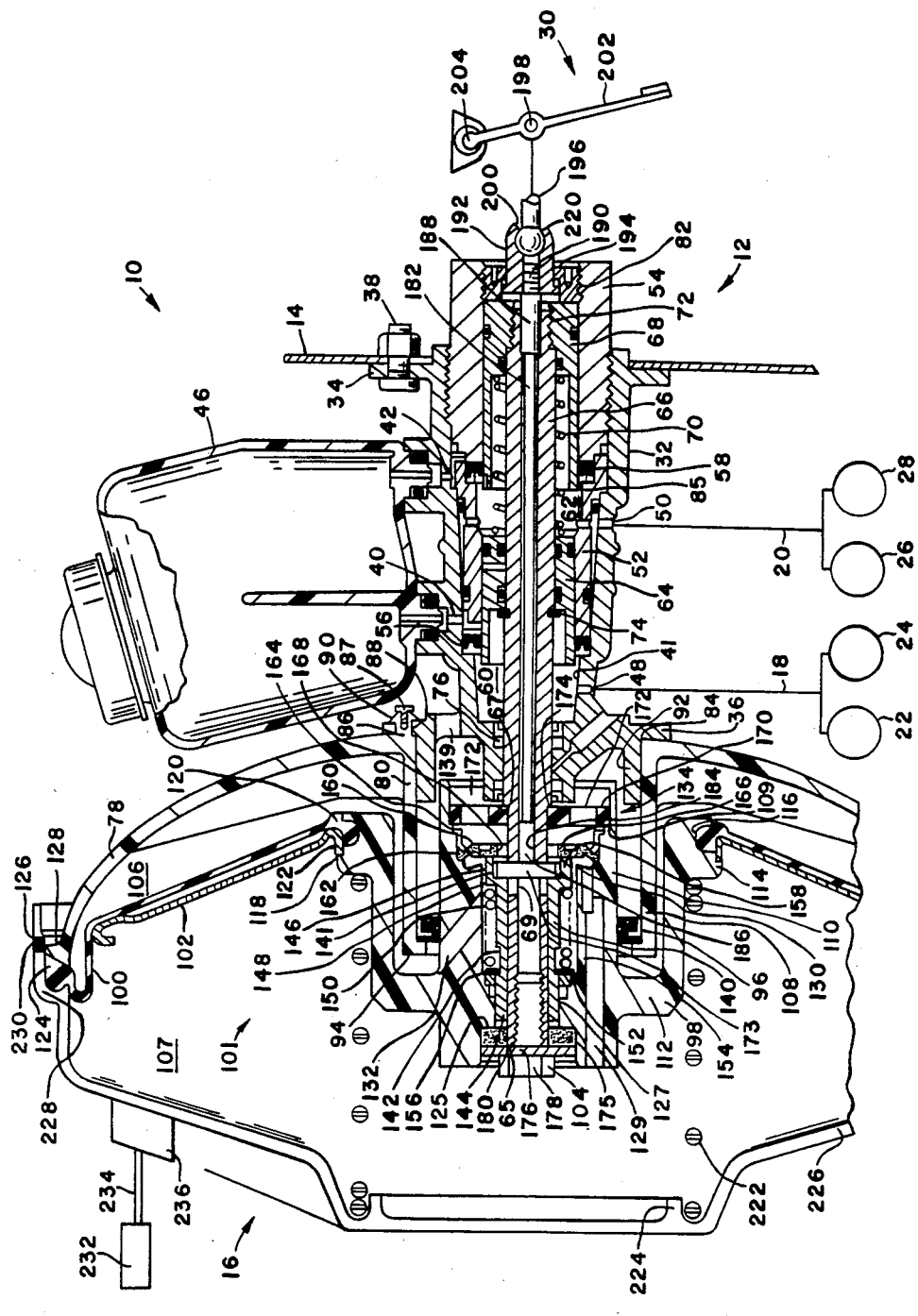

BRAKE ACTUATION ASSEMBLY AND METHOD OF ASSEMBLY

This invention relates to a brake actuation assembly having a power assist apparatus attached to a master cylinder which is fixed to a stationary member. A plunger has a caged spring arrangement fixed thereon to establish a rest position for a poppet member. The plunger has a keyway that retains a pin in a slot of a force transfer tube. The slot allows the plunger to move independently of the tube in response to an input force.

Recent concern with respect to weight of components in automobiles has led to the development of lightweight vacuum brake boosters. When such brake boosters are attached to the fire wall of a vehicle during some brake applications, the input force transmitted from the brake pedal can cause a deformation of the brake booster. This deformation is experienced as lost pedal motion which can result in an increase in the time to effect a brake application.

U.S. Pat. Nos. 2,603,066 and 2,900,962 issued July 15, 1952 and Aug. 25, 1959, respectively, disclose brake actuation assemblies having a master cylinder with a power assist mechanism attached to the end thereof. The master cylinder is fixed to a stationary member of the vehicle. This structure substantially eliminates lost pedal motion caused by deformation of the housing of the power assist mechanism. While investigating the operation of such puller type brake boosters, it was discovered that the overall reduction of lost pedal motion, while improved, was not eliminated. Further analyzation disclosed that a primary cause of lost pedal motion occurred because of the delay in the fluid pressure buildup in the master cylinder caused by delay in closing the compensation ports to the fluid reservoir of the master cylinder.

In the brake actuation assembly disclosed in U.S. patent application No. 437,940, an adjustment mechanism positions the pistons of the master cylinder with respect to the compensation ports to control the timing of the interruption of the fluid communication therebetween to substantially synchronize the movement of the pistons with the movement of the movable wall in the power assist mechanism. Thus, the lost pedal motion is substantially reduced to essentially the travel associated with the actuation of the control valve in the power assist mechanism.

While the brake actuation assembly disclosed in U.S. patent application No. 437,940 performed in an adequate manner, the assembly of the control valve requires precise alignment between the tubular puller member, the actuator rod and plunger. Since these components are relatively small and work space is limited in the pin installation area, a large amount of time is normally required to assemble such a brake actuation assembly.

In the brake actuation assembly disclosed herein assembly time is reduced by a substantially one-piece valve body or hub which contains a central stepped bore with passages for atmospheric air, vacuum and control pressure. A plunger located in the stepped bore has a valve spring which is caged to a predetermined load by a retaining ring. This ring fits into a groove on the plunger to establish a fixed distance between a vacuum seat and an atmospheric seat when the poppet valve is in the rest position. A tubular member which connects the movable wall to the pistons in the master cylinder extends through a central bore in the plunger. A recess or keyway on the plunger engages and traps a shouldered pin which slides in a slot in the tubular member. A push rod concentric to the tubular member engages the pin. In response to an input force, the push rod moves the plunger as the pin slides in the slots to compress the valve spring and bring the poppet into engagement with the vacuum seat. With the poppet on the vacuum seat, communication between the first and second chambers is interrupted. Further movement of the plunger moves the atmospheric seat away from the poppet to allow air to enter into the second chamber and create a pressure differential across the wall. This pressure differential acts on and moves the wall toward the first chamber. The tubular member pulls the pistons in the master cylinder to pressurize fluid therein and effect a brake application. A reaction force carried through the plunger and pin supplies the input push rod with an indication of the pressurized fluid developed to effect the brake application. The plunger and pin move independently of the tube member and when the brake application terminates the valve return spring and force of the reaction disc moves the plunger and poppet to a position wherein communication is again established between the chambers. When the pressure in the chambers equalizes, a pressure differential is created across the poppet which moves the retainer ring on the plunger into engagement with a stop to define the rest position for the plunger and poppet.

It is an object of this invention to provide a brake actuation assembly with a plunger that entraps a pin that slides in a slot of a puller tube to provide a connection between a movable wall and an actuation rod.

It is another object of this invention to provide a method of assembling a plunger to an actuation rod by inserting a pin in a slot in an actuation tube and moving the pin into a recess in the plunger and thereafter connecting the tube to a movable wall. An input push rod moves the plunger with respect to the actuation tube to operate the booster of the actuation assembly while the plunger moves with respect to the actuation tube to define a rest position. Thus, the plunger provides the booster with an advantageous reduction in the travel required by the input push rod to operate the booster.

These and other advantageous features of the invention should become apparent from reading the following description while viewing the accompanying drawings.

The FIGURE in the accompanying drawing is a schematic illustration of a brake actuation assembly with a sectional view of a master cylinder and power assist apparatus made according to the invention.

The brake actuation assembly 10 shown in FIG. 1 includes a master cylinder 12 which is fixed to a stationary member or wall 14 in a vehicle, a power assist apparatus 16 attached to the end of the master cylinder 12, conduits 18 and 20 for connecting the master cylinder with the brake located on wheels 22, 24, 26, and 28 of the vehicle and an actuator member 30 through which an input force from the operator is transmitted from an operator to the power assist apparatus 16.

In more particular detail, the master cylinder 12 has a housing 32 with a first flange 34 and a second flange 36. A plurality of bolts 38, only one of which is shown, fix housing 32 to the stationary wall 14. Housing 32 has a stepped or tapered bore 41 therein with ports 42 and 40 connected to reservoir 46 in addition to ports 48 and 50 to which conduits 18 and 20 are connected. A sleeve 52 of a type disclosed in U.S Reissue Pat. No. 31,080 is positioned in bore 41 by an end bearing 54. Cup seals 56 and 58 are positioned in bore 41 by sleeve 52 and end bearing 54. A first piston 64 which engages seal 56 and a sleeve or tube 66 cooperates with housing 32 to define a first chamber 60. Communication from reservoir 46 to chamber 60 through port 40 is controlled by cup seal 56.

A second piston 68 attached to the end of sleeve or tube 66 by threaded connection 72 engages cup seal 58 to cooperate with sleeve 52 and piston 64 to define a second chamber 62. A spring 70 which is located between pistons 64 and 68 urges piston 64 against a stop 74 on sleeve or tube 66 to define the limits of chamber 60 and 62. An adjustment mechanism 82 attached to bearing 54 engages piston 68 and moves end 85 with respect to cup seal 58 to define the opening from port 42 to chamber 62 with piston 68 in the rest position as shown. Since piston 64 is urged against stop 74, the same opening relationship is established between port 40 and chamber 60. Tube or sleeve 66 which is attached to piston 68 extends through opening 76 into the power assist apparatus 16.

The power assist apparatus 16 has an end shell 78 with a dome or spherical shape. An annular projection 80 extends from opening 84 in the center of the end shell 78. A series of tabs 86 (only one is shown) are located in corresponding opening 88 in flange 36. The barb 90 on tabs 86 initially contracts to move past opening 88 but later expands to lock or secure end shell 78 to flange 36 as shown in the drawing. The annular projection 80 rests on projection or lip 92 that extends from housing 32. Lip 92 provides structural stability for maintaining annular projection 80 in axial alignment with bore 41. Projection 80 has an annular stop 94 on the end thereof which retains bearing seal 96.

A wall member 101 consisting of hub 98, diaphragm 100, retainer 102, and reaction fasteners 104 is connected to the rear shell 78 to form a chamber 106.

The hub 98 is substantially a unitary member having a first cylindrical member 108 and a second cylindrical member 110 that extend from an end member 112. The first cylindrical member 108 has a shoulder 114 with a groove 116 therein adjacent an annular stop 118. A first bead 120 on diaphragm 100 holds flange 122 on retainer 102 against stop 118. A second bead 124 on diaphragm 100 is located in a groove 126 on the peripheral surface 128 on rear shell 78.

The second cylindrical member 110 engages seal 96 and with the first cylindrical member 108 surrounds the annular projection 80 to form a compact arrangement. The end member 112 has an axial bore 127 that extends from the interior of cylindrical member 110. A first passage 129 extends from the end member 112 to an annular seat 130 in the interior of the second cylindrical member 110. A second passage 132 located in cylindrical member 110 between seat 130 and end member 112 connects the interior of cylindrical member 110 with chamber 106.

A control valve arrangement 134 located in the second cylindrical member 110 controls communication of fluid through passage 129 and air through passage 132 to chamber 106. Control valve arrangement 134 includes a cylindrical plunger 140 which has a peripheral surface that slides in passage 127 on end member 112, a groove 142 between a first end 144 and a second end 146. A shoulder 148 adjacent end 146 forms a seat for valve return spring 150. A ring 152 located in groove 142 engages the plunger to cage spring 150 between shoulder 148 and lip 154. The distance between end 158 which functions as a vacuum seat and shoulder or stop 156, is greater than the distance between stop 156 and atmospheric seat 130. Ring 152 engages stop 156 to establish a rest position for plunger 140. A poppet 160 has a first end 162 fixed to the interior of cylindrical member 110 by a retainer 164 and a second end 166 that is free to move within cylinder 110. An opening 168 allows air from the surrounding environment to be presented at all times to the second end 146 of plunger 140.

An end cap 170 secured to the second cylindrical member 110 has a first series of openings 172,172' which allows air to enter the poppet area 160 and a central opening 174. Puller tube 66 extends through opening 174 until shoulder 67 engages end cap 170.

Puller tube 66 has a vertical slot 69 located a preset distance from shoulder 67 such that end 146 of plunger 140 substantially surrounds slot 69. A pin 173 located in slot 69 is positioned in vertical keyway 141 in plunger 140.

A reaction disc 175 is located adjacent a shoulder 125 by a reaction washer 176. A nut 178 of fastener 104 which engages washer 176 is screwed into threads 180 on the end of tube 66 and in addition to holding reaction disc 174 against shoulder 125 holds shoulder 67 against end cap 170.

Push rod or actuation rod 182 has a first cylindrical member 184 on a first end 186 and a second cylindrical member 188 on a second end 190. The first and second cylindrical members 184 and 188 are of substantially the same diameter as the interior of tube 66 and as such are guided by the same. End 186 engages pin 173 while end 188 which has threads on the end thereof is connected to a socket member 192. A tab 194 on adjuster 82 forms a stop to prevent push rod 66 from extending out of the tubular member or tube 66.

A ball 200 on the end of push rod 196 is retained in socket 192 by crimping the end 220 over the ball 200.

Push rod 196 has an eye member 198 which is connected to pedal 202. Pedal 202 is located on pivot pin 204. The weight of pedal 202 is such that a force is generated that holds end 186 of push rod 182 against pin 173.

A return spring 222 is placed on the first cylindrical member 108 with the end engaging shoulder 114. A front shell 226 has a spring guide 224 which retains the return spring and has a flange 228 that engages bead 124 to form a seal. Tabs on peripheral surface 128 snap into a groove to lock the first and second shells 78 and 226 together to form a unitary structure and chamber 107 therein.

METHOD OF ASSEMBLY OF THE INVENTION

The master cylinder 12 is assembled by placing the piston 64 in bore 40 of sleeve 52 until stop 74 on tube 66 is engaged. Spring 70 is inserted over tube 66 and bearing member 54 attached to housing 32 to align seals 56 and 58 adjacent openings 40 and 42 respectively. Push rod 182 is inserted in tube 66 and adjustment nut 82 attached to bearing member 54.

End 65 of tube 66 which passes through both piston 64 and 68 and opening 76 of master cylinder housing 32 extends a preset distance from flange 36. The dome shaped rear shell 78 is brought onto guide projection 92 and tabs 86 aligned in openings 88. When barbs 90 pass through holes or openings 88 they expand out to secure the rear shell 78 to flange 36. A lock member 87 can be inserted in tabs to assure that barbs 90 remain fixed against flange 36.

End cap 170 is placed against shoulder 67 on tube 66 and pin 173 inserted in slot 69.

Spring 150 is placed on the peripheral surface of plunger 140 and compressed sufficiently so that ring 152 can be inserted into groove 142. At the same time plunger 140 is being assembled, backing plate 102 is placed against stop or lip 118 on shoulder 114 and bead 120 is snapped into groove 116 to form a unit. Thereafter, plunger 140 is inserted in bore 126 and bead 162 of poppet 160 fixed in cylindrical member 110 by retainer 164. End 65 of tube 66 is aligned with opening 174 in end cap 170 and hub member 104 is moved toward shell 78. As hub 104 moves, end 65 engages plunger 140, thereafter, the peripheral surface on cylindrical member 140 engages seal 96. Further movement brings pin 173 into recess or keyway 141 and end cap 170 into engagement with shoulder 109 on the second cylindrical member 110. Thereafter reaction disc 175 is located on the end 65 of tube 66 and washer 176 brought into contact with the reaction disc 175 as nut 178 is screwed into threads 180.

When nut 178 is torqued onto tube 66 a fixed distance is formed between end cap 170 and washer 176. With hub 104 positioned on guide projection 80, bead 124 on diaphragm 100 is aligned on groove 126.

Return spring 222 is placed on the first cylindrical member 108 and the end thereof brought into engagement with shoulder 114. Guide surface 224 on shell 226 is placed on the end of return spring 222 and a force applied to compress spring 222 and bring flange 228 into engagement with bead 124. Thereafter, tabs on peripheral surface 128 snap into slots 230 to lock shells 226 and 78 together to form a unitary structure.

When the booster assembly is attached to the master cylinder 12, adjustment member 82 is moved with respect to guide 54 to position pistons 64 and 68 in bore 41. Since plunger 140 is free to move on tube 66, the adjustment with respect to pistons 64 and 68 has no bearing on the operation of control valve 134.

MODE OF OPERATION OF THE INVENTION

When the engine in a vehicle equipped with a brake actuation assembly 10 as shown in the drawing is operating, vacuum is produced at the intake manifold 232. Vacuum is communicated through conduit 234 past check valve 236 to chamber 107.

With vacuum in chamber 107, any air in chamber 106 is evacuated by way of passage 132, the interior of cylindrical member 110, and passage 129. Return spring 222 acting through hub 114 holds the movable wall 101 in a fixed position adjacent shell 78. Since end cap 170 is attached to hub 104, the return force of spring 222 is carried through tube 66 to piston 68 which abuts stop or adjustment member 82 to establish a rest position for the movable wall 101 and pistons 64 and 68.

With vacuum communicated to both the first and second chambers 107 and 106, a pressure differential is created across the plunger 140 since free or second end 166 of poppet 160 is seated on end or seat 158 of plunger 140. This pressure differential moves plunger 140 with respect to tube 66 until ring 152 engages stop or shoulder 156 to establish a set distance between the free end 166 and vacuum seat 130.

When an operator desires to effect a brake application, an input is applied to pedal 202 causing it to pivot on pin 204 and impart a linear input to push rod 196.

The movement to push rod 196 is carried through push rod 182 to end 186 on cylinder 184. End 186 acts on pin 173 to move plunger 140 such that free end 166 engages seat 130 to interrupt communication of vacuum past seat 130. Further movement of plunger 140 moves seat 158 away from free end 166 to allow air to enter chamber 106 by way of passage 132. With air in chamber 106 and vacuum in chamber 107, a pressure differential is created across wall 101. This pressure differential acts on wall 101 to create a force that is transferred into hub 114 and to tubular member 66 by way of reaction disc 175 and washer 176. The resistance to movement of pistons 64 and 68 in chambers 60 and 62 cause the reaction disc 175 to be compressed and provide end 144 on plunger 140 with a force that is carried through pin 173 to push rod 182. When the reaction force and input force are balanced, a desired braking condition should occur since pressurized fluid is transferred through conduits 18 and 20 to wheel brakes 22, 24, 26, and 28.

When the input force on pedal 202 terminates, valve return spring 150 moves plunger 140 such that seat 158 engages free end 166 of poppet 160 to interrupt communication of air to chamber 106. Thereafter, free end 166 is moved off of seat 130 to allow vacuum present in chamber 107 to evacuate air from chamber 106. As the air in chamber 106 is evacuated, return spring 222 acts on and moves wall 101 and pistons 64 and 68 toward their rest position as shown in the drawing. When wall 101 reaches its rest position, the pressure differential across plunger 140 moves the plunger 140 until ring 152 again engages stop 156 to position the poppet 160 such that free end 166 is positioned adjacent vacuum seat 130.

We claim:

1. In a brake actuation assembly having a master cylinder and a power assist apparatus, said master cylinder having a housing with a first end fixed to a stationary member and a second end, said power assist apparatus having a first shell connected to a second shell, said second shell being attached to said second end of said master cylinder, said power assist apparatus having a wall that divides the interior of said first and second shells into first and second chambers, a valve connected to said wall for controlling communication of a first fluid between said first and second chambers, an actuation member extending through an opening in said second shell for operating said valve in response to an input signal, and a tube concentric to said wall with said master cylinder, said actuation member responding to said input signal for moving said valve to interrupt fluid communication between said first and second chambers and initiate communication between said second chamber and the surrounding environment to create a pressure differential across said wall, said pressure differential acting on and moving said wall toward said first shell to produce an output force, said tube transmitting said output force to said master cylinder to effect a brake application corresponding to said input signal, characterized by said valve having a hub member attached to said wall and sealably retained within said second shell, said hub member having a stepped axial bore with a first passage separated from a second passage by a first annular seat, a cylindrical plunger concentric to said tube with a reaction surface on a first end and a second annular seat on a second end, said plunger having a shoulder on its peripheral surface adjacent said second end and a groove between said shoulder and said first end, said plunger having a radial keyway, a pin located in said keyway and extending through slots in said tube, a resilient member concentric to said plunger having a first end that engages said shoulder and a second end that engages a retainer located in said groove, and a poppet member having a bead fixed to said hub and a free end with an opening therein, said first fluid and the air in the surrounding environment creating a pressure differential that act on said poppet to initially move said free end into engagement with said second annular seat and seal said second chamber from the surrounding environment, and thereafter move said retainer into engagement with a stop on said hub to establish a preset distance between said free end and said first annular seat, said actuator member engaging said pin and responding to said input signal by moving said reaction surface on said plunger into engagement with a force transmitting disc and said annular surface away from said free end after said free end engages said first annular seat to seal said first passage from said bore and thereafter allow said second chamber to be in communication with said second passage, the opening in the free end of the poppet, and an opening in said second shell to allow air from the surrounding environment to enter said second chamber.

2. The brake actuation assembly as recited in claim 1 wherein said second shell is characterized by a cylindrical guide surface that extends toward said first shell, said hub member engaging said guide to substantially maintain said tube in an axial position during a brake actuation.

3. The brake actuation assembly as recited in claim 2 wherein said actuation member is characterized by a pedal, a first push rod connected to said pedal and a push rod extension having a socket on one end for receiving a ball attached to said first push rod and a cylindrical end that engages said tube, said tube holding said cylindrical end in alignment with said pin to provide said plunger with a substantially uniform input signal.

4. The brake actuation assembly as recited in claim 3 wherein said hub member telescopes over said cylindrical guide surface to form a compact structure.

5. A brake actuation assembly comprising:
a master cylinder having a housing with a first flange and a second flange, said first flange being fixed to a stationary member, said housing having a bore therein connected to wheel brakes of a vehicle and a fluid reservoir, and pistons located in said bore and responsive to an input force for supplying said wheel brakes with pressurized fluid to effect a brake application;
a power assist apparatus having a first shell with tabs surrounding an opening, said tabs passing through openings in said second flange to secure said first shell to said master cylinder, said first shell having an annular projection that extends from said opening in a direction away from said master cylinder, a hub member having first and second cylinders that extend from an end member, a wall member connected to said first cylinder and said first shell substantially define a first chamber, said second cylinder engaging said annular projection to seal said first chamber, said end member having an axial bore that extends to said second cylinder, said hub having a first passage that extends to an opening adjacent a first seat in said second cylinder and a second passage that extends through said second cylinder;
a plunger substantially concentric to said second cylinder and having a bearing surface that engages said axial bore in said end member, said plunger having a shoulder and a groove on its peripheral surface, said plunger having a reaction surface on one end and a second seat on the other end, said plunger having a keyway adjacent said second seat;
a spring located on the peripheral surface of said plunger and a retainer located in said groove to secure said spring to said plunger;
a poppet member having a first end secured to said second cylinder and a free end;
a force transmitting tube for connecting said end member with said pistons, said tube having a slot therein;
a pin located in said slot in said tube and extending into said keyway of said plunger;
a push rod located in said tube and having a first end engaging said pin and a second end connected to an actuation member;
a second shell connected to said first shell, said second shell, said wall member and hub member substantially defining a second chamber, said second chamber being connected to a source of fluid; and
a return spring located between said second shell and said hub, said return spring acting on said hub and moving said wall member toward said first shell, at the same time said free end of said poppet engaging said second seat to allow said fluid to be communicated to said first and second chambers by way of said first and second passages, said first fluid and air from the surrounding environment creating a pressure differential across said poppet member and plunger to move said retainer into engagement with a stop on said second cylinder and position said free end of said poppet a preset distance from said first seat, said push rod reacting to an input force by moving said pin in said slot to bring said free end of said poppet into engagement with said first seat and interrupt communication of said fluid to said first chamber and said second seat away from said second end to allow air to enter said second chamber and create a pressure differential across said wall member, said pressure differential acting on said wall to move said hub toward said second chamber, said tube member transferring movement of said wall member to said pistons to create said pressurized fluid in said master cylinder.

6. In the brake actuation assembly as recited in claim 5 wherein said reaction surface on said plunger is responsive to the resistance of movement of said pistons to provide said push rod with an indication of pressurized fluid supplied said wheel brakes.

7. A method of assembling a brake actuation assembly having a master cylinder with a first flange secured to a stationary member and a second flange with a power assist apparatus connected thereto comprising the steps of:
inserting a seal in a projection that extends inwardly from an opening of a first shell;
attaching said shell to said second flange;
placing a spring on a peripheral surface of a plunger between a shoulder and a groove, said plunger having an axial bore;
compressing said spring toward said shoulder;
placing a ring in said groove of said plunger to maintain said spring in a preset condition;

moving said plunger in a guide surface of a hub member until said ring engages a stop;

fixing a peripheral bead on a poppet to said hub member, said poppet having a seat surface that surrounds a central opening;

locating an end cap on a tube adjacent to a shoulder;

placing a pin in a slot in said tube;

inserting said tube in said axial bore until said pin is located in a keyway in said plunger and said end cap is secured to said hub;

placing a push rod inside of said tube until a cylindrical end thereon engages said pin;

locating a resilient disc on said tube adjacent said plunger;

fixing a washer to said tube to establish a set distance between said end cap and resilient disc;

attaching a wall member to said hub;

inserting said tube in an opening in said master cylinder to bring said hub into engagement with said seal;

positioning a bead on said wall in a groove on the peripheral surface of said shell;

securing said tube to a piston in said master cylinder;

placing a return spring on said hub;

locating a second shell on said return spring;

compressing said return spring to bring said second shell into engagement with said bead; and attaching said second shell to said first shell to form said power assist apparatus.

8. The method as recited in claim 7 further including the step of:

adjusting the position of said tube with respect to said master cylinder to align said piston within said master cylinder.

9. The method as recited in claim 8 further including the step of:

securing said push rod within said tube to assure that said cylindrical end thereof is retained in contact with said pin.

* * * * *